V. H. BUSCHMAN.
Velocipede.
No. 95,648.
Patented Oct. 12, 1869.
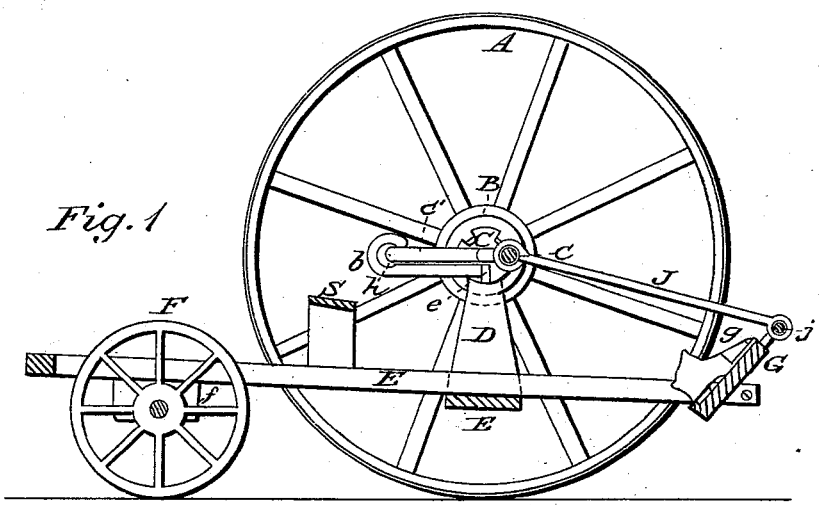
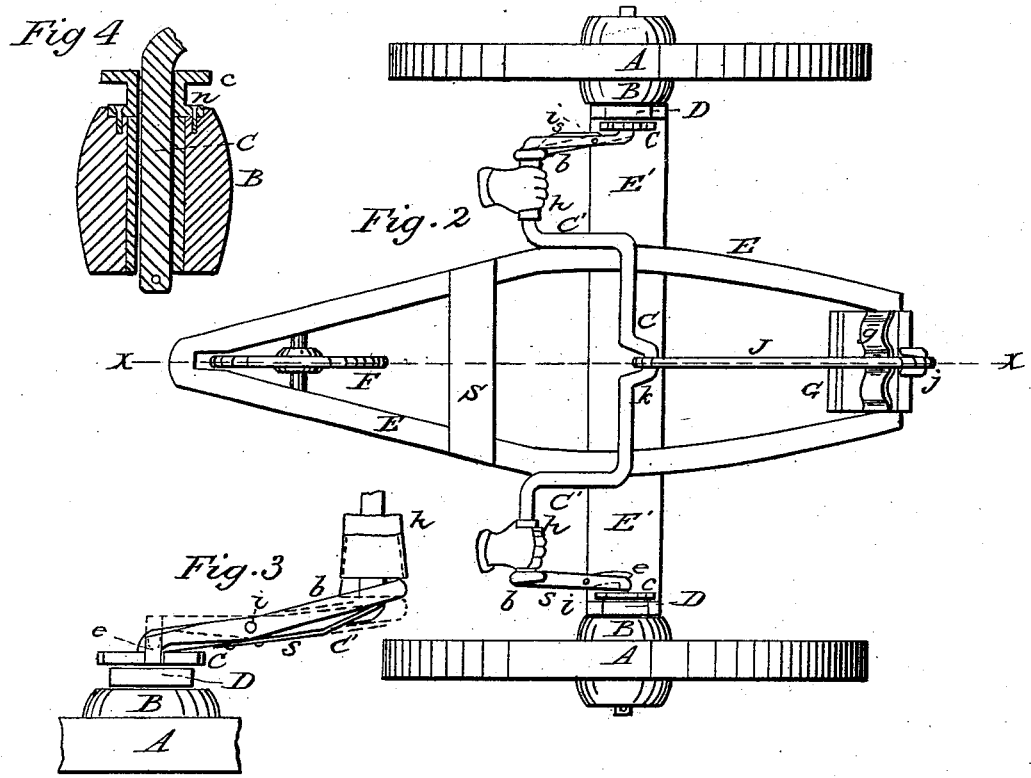

United States Patent Office.

VICTOR H. BUSCHMAN, OF BALTIMORE, MARYLAND.

Letters Patent No. 95,648, dated October 12, 1869; antedated September 29, 1869.

---

IMPROVEMENT IN VELOCIPEDES.

---

The Schedule referred to in these Letters Patent and making part of the same.

---

*To all whom it may concern:*

Be it known that I, VICTOR H. BUSCHMAN, of Baltimore, in the county of Baltimore, and State of Maryland, have invented a new and improved Velocipede; and I do hereby declare that the following is a full, clear, and exact description thereof, reference being had to the accompanying drawings, making part of this specification, in which—

Figure 1 is a section, taken longitudinally through the centre of the improved velocipede, in the vertical plane indicated by red line $x\ x$ in fig. 2.

Figure 2 is a plane view of the carriage, complete.

Figure 3 is a view in detail, showing the devices for disengaging the crank-shaft, or axle from, and engaging it with its wheels.

Figure 4 is a sectional view, in detail, of one of the hubs of the transporting-wheels, showing the manner of constructing the ratchet-wheels with collars, and applying them to the hubs of such wheels.

Similar letters of reference indicate corresponding parts in the several figures.

This invention relates to improvements on velocipedes which have three transporting-wheels.

The nature of my invention consists—

First, in arranging the seat for the rider upon a frame which is suspended beneath the axle of two large transporting-wheels, and sustained at its rear end upon a smaller wheel, said axle being cranked in such manner, and connected to a treadle, or vibrating foot-board, that the rider can conveniently apply the power of his arms and feet to propel the carriage, as will be hereinafter explained.

Secondly, in adapting the driving-wheels to serve also as guiding-wheels, by the employment of ratchet-wheels and pawl-levers, connected to or operated by sliding handles upon the hand-cranks of the axle of said wheels, whereby the rider can disengage either one of these wheels from the axle, or engage the same with the axle, at pleasure, whether the carriage be in motion or at rest, as will be hereinafter explained.

To enable others skilled in the art to understand my invention, I will describe its construction and operation.

The two large transporting-wheels, A A, are applied on the ends of an axle, C, which has three cranks formed on it, by bending it, as shown in fig. 2.

The two cranks, C' C', are arranged equidistant from the central crank $k$, and are intended to be grasped by the hands of the rider, for turning the axle and wheels A A.

To the outer arms of the cranks C' C' lever-pawls $b\ b$ are pivoted, at $i\ i$, and acted upon by springs $s\ s$, so as to engage their teeth $e\ e$ with one of several notches formed in ratchet-wheels or flanges $c\ c$ of collars $n\ n$.

The opposite ends of lever-pawls $b\ b$ are connected loosely, by eyes formed on them, to the horizontal portions of cranks C' C', so that by pressing outwardly the hand-tubes $h\ h$ on these portions of the cranks, the teeth $e\ e$ will be disengaged from the ratchet-flanges $c\ c$, and wheels A A will be allowed to turn loosely around their axle.

By drawing the tubes $h\ h$ inwardly, the springs $s\ s$ will engage the teeth $e\ e$ with their respective ratchets, and thus engage said wheels A A with their axle.

By connecting the levers $b\ b$ to the outer ends of tubes $h\ h$, the springs $s\ s$ may be dispensed with.

The ratchet-flanges $c\ c$ are formed on short collars $n\ n$, which are secured concentrically to the inner ends of hub B B of wheels A A, and through which the journals of the axle pass freely. Consequently, by engaging these collars with the pawl-levers $b\ b$, as above described, the wheels A A can be turned by turning the axle C.

From these collars $n\ n$ depend two stirrups D D, which sustain a horizontal transverse beam, E', at a suitable distance beneath the axle C.

The stirrups D D are applied to the said collars by tubular bearings, in which these collars turn freely.

The beam E' receives centrally across it, and has secured rigidly to it a light frame, E, which may be made of the elliptical or tapering form represented in fig. 2, and which is sustained, at its rear end, upon the axle of a small wheel, F.

From this frame E rises the seat S, for the rider, which seat is arranged in rear of the beam E', and in a horizontal plane below axle C, as shown in fig. 1.

At or near the front end of frame E, and at a suitable distance from the seat S, is a vibrating foot-board or treadle, G, with foot-straps $g$ applied to it.

The upper free end of this board G is jointed by a staple, $j$, to a rod, J, which extends backward and upward, and is connected to the central crank $k$, so that by the motion of the feet upon said board G, the rider can apply the force of his legs, as well as arms, in propelling the carriage.

It will be seen, from the above description, that the rider sits upon the seat S, with his legs extended beneath the axle C, and his feet against the vibrating board G. He grasps the two cranks C' C' by the sliding tubes $h\ h$, and, by a movement of his arms and body, similar to that of rowing a boat, he turns the axle C, and propels the carriage.

When it is desired to turn to the right or left-hand, the sliding tube $h$, on the proper side, is pressed outwardly, which disengages the driving-wheel nearest this tube from its axle, and allows the carriage to be turned about this loose wheel, by power applied to the opposite fast wheel.

Having described my invention,

What I claim as new, and desire to secure by Letters Patent, is—

1. The arrangement of the seat-frame E, suspended beneath a cranked axle, C, of transporting-wheels A A, and sustained at a point in rear of seat S, upon supporting-wheel F, substantially as described.

2. The tubular hand-slides $h\ h$ on cranks C' C' of axle C, in combination with pawls applied to these cranks, and ratchets applied to the wheels A A, and a rider's seat, suspended beneath said axle, substantially as and for the purposes described.

3. The treadle or vibrating foot-board G, and connecting-rod J, in combination with the cranked axle C of two transporting-wheels, and a support for the rider, beneath this axle, substantially as and for the purposes described.

4. The flanged collars $n\ n$, applied to the hubs of wheels A A, and adapted to serve as ratchets for pawls $b\ b$ on cranks C' C', and also as a means for suspending the front part of seat-frame E, beneath the axle C, substantially as described.

VICTOR H. BUSCHMAN.

Witnesses:
C. I. HINRICHS,
OTTO BENNER.